United States Patent [19]

Ishikawa

[11] Patent Number: 4,901,593
[45] Date of Patent: Feb. 20, 1990

[54] ADJUSTABLE VEHICLE STEERING MECHANISM

[75] Inventor: Masanobu Ishikawa, Nagoya, Japan

[73] Assignee: Aisin Seiki Kabushiki Kaisha, Kariya, Japan

[21] Appl. No.: 301,714

[22] Filed: Jan. 26, 1989

[30] Foreign Application Priority Data

Jan. 26, 1988 [JP] Japan .................................. 63-15299

[51] Int. Cl.⁴ ................................................ B62D 1/18
[52] U.S. Cl. ...................................... 74/493; 280/775
[58] Field of Search .......................... 74/493; 280/775

[56] References Cited

U.S. PATENT DOCUMENTS

| 4,503,504 | 3/1985 | Suzumura et al. | 74/493 X |
| 4,633,732 | 1/1987 | Nishikawa et al. | 74/493 |
| 4,691,587 | 9/1987 | Farrand et al. | 74/493 |
| 4,785,684 | 11/1988 | Nishikawa et al. | 74/493 |
| 4,796,481 | 1/1989 | Nolte | 74/493 |

Primary Examiner—James R. Brittain
Attorney, Agent, or Firm—Banner, Birch, McKie & Beckett

[57] ABSTRACT

The present disclosure is directed to a vehicle steering mechanism which independently allows for tilting or telescopic motion of the steering wheel. The mechanism includes a stationary bracket having a slider mounted for axial movement with respect to the stationary bracket. A lower main shaft is rotatably journalled within the stationary bracket and slider, and is splined to a middle main shaft portion. The middle main shaft portion is pivotally linked to an upper main shaft portion which extends through an upper bracket. The upper bracket is pivotally mounted for pivotable motion with respect to the slider. The steering wheel is attached to the upper shaft. The upper bracket and the upper main shaft pivot around a coaxial pivot rod. First screw shafts are mounted for rotational motion, extend through the stationary bracket and are linked to the slider such that rotational motion of the screw shafts by a first motor cause the slider to move with respect to the bracket. A second shaft extends below the slider and is linked to the support bracket. Rotation of the second shaft by the first motor causes the support bracket and upper shaft to pivot. The mechanism further includes a second motor for moving a switching rod between two positions. In the first position, the rod is lined to the first shaft such that rotation of the first motor causes telescopic motion. In the second position, the rod is linked to the second shaft such that rotation of the first motor causes pivoting motion. Pivotal motion occurs independently of telescopic motion depending upon the position of the rod.

6 Claims, 7 Drawing Sheets

ADJUSTABLE VEHICLE STEERING MECHANISM

BACKGROUND OF THE INVENTION

1. Field of the Invention

The present invention relates to a vehicle steering mechanism, and in particular, to an improved tiltable and telescopically extensible steering shaft mechanism for a vehicle steering mechanism.

2. Description of the Prior Art

A vehicle steering mechanism including a conventional tiltable and telescopically extensible steering shaft mechanism disclosed in U.S. Pat. No. 4,785,684, issued on Nov. 26, 1988, and hereby incorporated by reference, is shown in FIG. 1. Steering mechanism 100 includes steering wheel 700 mounted on shaft 400 which is further supported by upper bracket 230. Lower screw shaft 600 and upper screw shaft 160 extend from stationary bracket 200. First nut member 210 is disposed around lower screw shaft 600 and second nut member 240 is disposed around upper screw shaft 160 for axial movement therealong when the screw shafts rotate. Support bracket 230 is disposed for pivotable motion about pivot pin 220 extending from first nut member 210 and pivot pin 250 extending from second nut member 240. Lower screw shaft 600 is rotated by a motor (not shown). Upper shaft 160 is also rotated by the motor through a clutch means (not shown). Rotation of lower shaft 600 or upper shaft 160 by the motor causes first nut member 210 or second nut member 240 to move along lower screw shaft 600 and upper screw shaft 160, respectively.

When the motor is operated to rotate lower screw shaft 600 to move first nut member 210 therealong, support bracket 230 pivots about pivot pins 220 and 250 causing tilting motion of steering wheel 700. When the motor rotates both upper shaft 160, through the clutch means, and lower shaft 600, both first nut member 210 and second nut member 240 move along lower shaft 600 and upper shaft 150 respectively, causing telescopic or axial translational movement of steering wheel 700 toward or away from the driver. However, since upper shaft 160 is positioned just above pivot pin 250, during tilting movement of steering wheel 700 due to movement of only first nut member 210 along lower screw shaft 600, an excessive level of force is applied to second nut member 240 tending to deform second nut member 240 and upper screw shaft 160. In order to compensate for this excessive force, both second nut member 240 and upper screw shaft 160 have been made of an extremely rigid and strong material to prevent deformation. However, even with the use of strong material, wear and tear of the elements occurs.

SUMMARY OF THE INVENTION

It is an object of the present invention to provide a tiltable and telescopically extendible vehicle steering mechanism in which the problem of deformation of the screw shaft and nut member during tilting motion is eliminated.

It is another object of the present invention to provide a steering mechanism in which the telescopic and pivotable movements occur independently of each other and in which the shaft elements for telescopic movement and the pivot points are distinct elements located apart from each other.

The steering mechanism in accordance with the present invention includes a stationary bracket fixedly mounted to a vehicle body. A lower main shaft which is further linked to the wheels of the vehicle through intermediate elements is rotatably journalled in the stationary bracket. A slider is mounted on the stationary bracket for axial movement towards and away from the stationary bracket. An upper support bracket is pivotably mounted on the slider. A middle main shaft is splined within the lower main shaft, extends through the stationary bracket and is rotatably journalled within the slider. An upper main shaft is pivotably mounted with respect to the middle main shaft and is rotatably journalled within the upper bracket.

A pair of first screw shafts are rotatably journalled within the stationary bracket and include a pair of first nuts threadably mounted thereon and fixedly connected to the slider. A second screw shaft is rotatably journalled within a lower projection of the slider and includes a second nut threadably mounted thereon and secured within the upper bracket. A joint links the middle shaft and the upper shaft within the upper support bracket and the slider such that the upper shaft undergoes axial motion simultaneously with the middle shaft and upper support bracket upon rotational motion of the first screw shafts to move the slider with respect to the stationary bracket. A pivot pin extends through the upper support bracket and the slider, allowing the upper support bracket to pivot or tilt with respect to the slider and the upper shaft to pivot with respect to the middle shaft upon rotational movement of the second screw shaft.

A steering wheel is linked to the upper shaft and thus may either tilt with respect to the middle shaft and the slider, when the second screw is rotated, or undergo telescopic motion simultaneously with the slider with respect to the stationary bracket when the first shafts are rotated. An operating device includes a driving device, and a switching device for transmitting rotational motion from the driving device either to the first screw shafts or the second screw shaft. Thus, the steering wheel independently undergoes either pivotable or telescopic movement, and the pivot point for the steering wheel is disposed away from the means for providing telescopic or axial motion of the steering wheel.

Further objects, features and other aspects of the invention will be understood from the detailed description of the preferred embodiment of the invention with reference to the annexed drawings.

DETAILED DESCRIPTION OF THE PREFERRED EMBODIMENT

Figure 1:
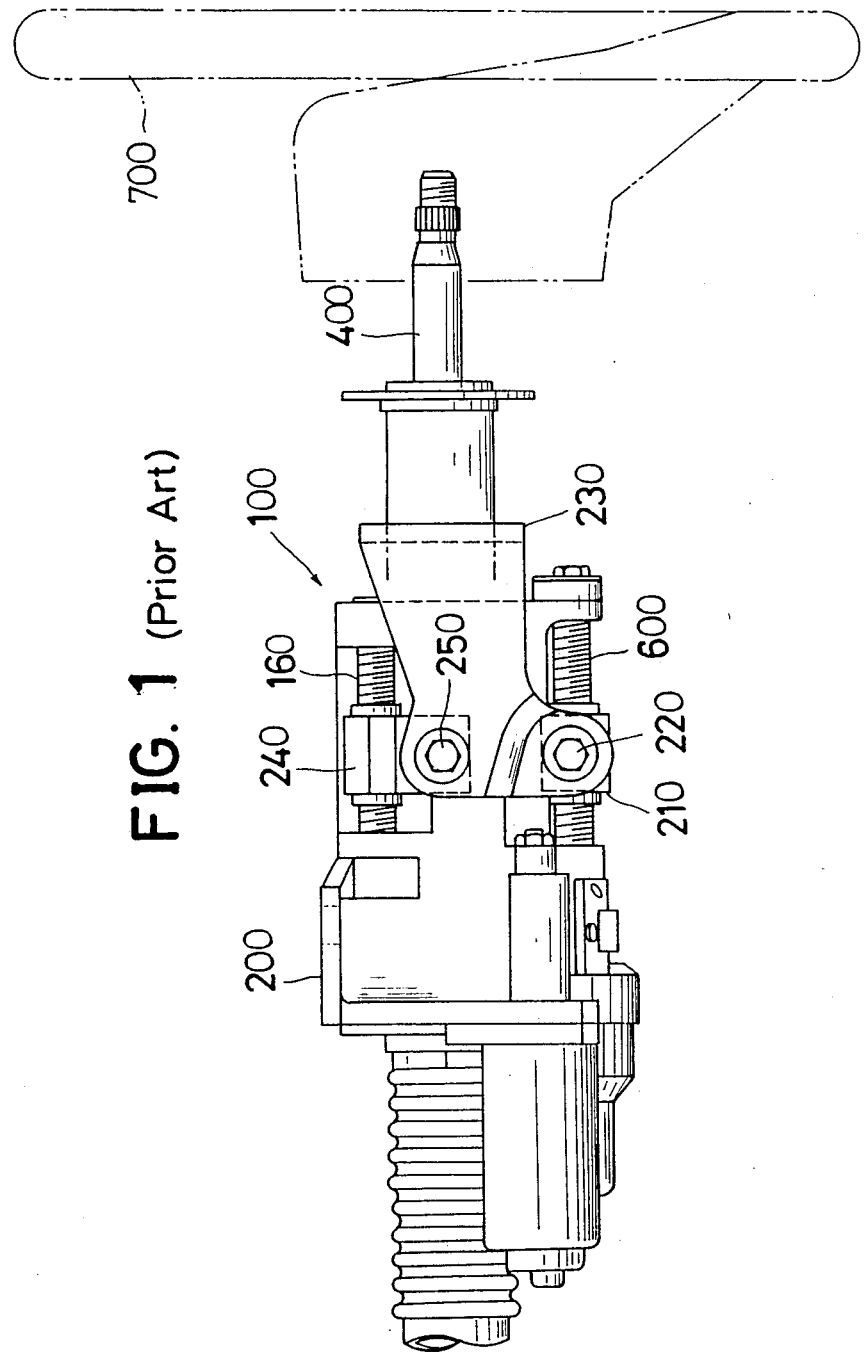
FIG. 1 is a side view of a vehicle steering mechanism in accordance with the prior art.
Figure 2:
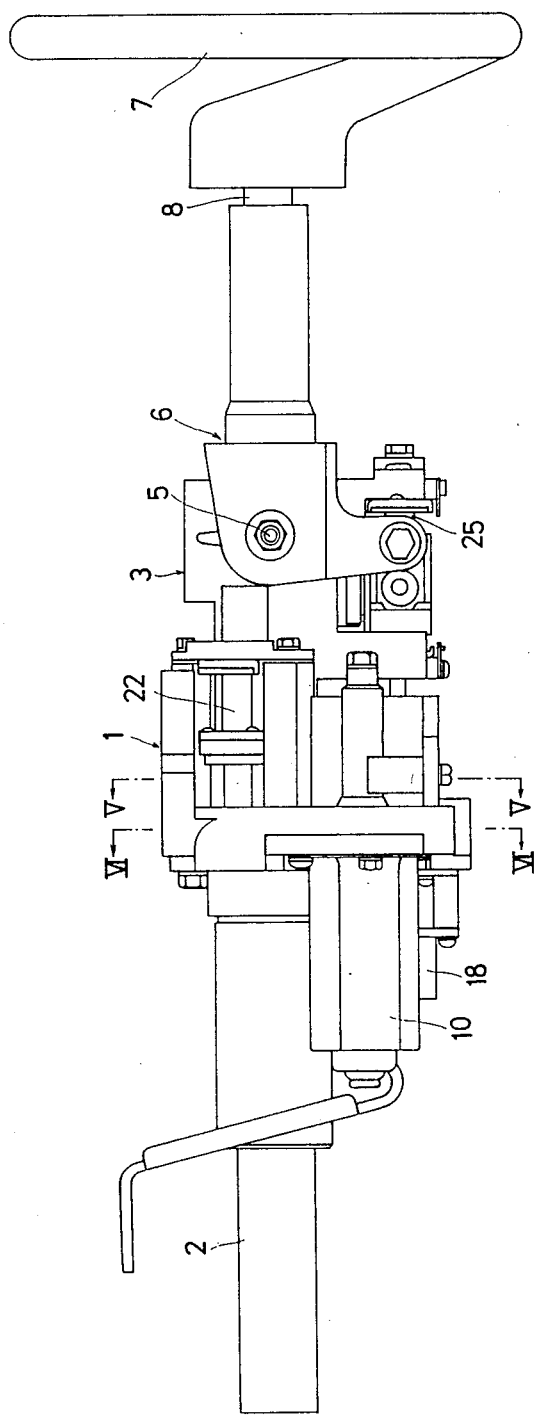
FIG. 2 is a side view of the overall vehicle steering mechanism in accordance with the present invention.

With reference to FIGS. 2-7, the vehicle steering mechanism according to the present invention includes stationary bracket 1 fixedly mounted to a vehicle body (not shown). Lower main drive shaft 2 is linked to the wheel of the vehicle through intermediate elements (not shown), and includes a rearward portion rotatably journalled within stationary bracket 1. Forward support member 30 extends from the forward surface of stationary bracket 1 and lower main shaft 2 extends therethrough into stationary bracket 1. Lower main shaft 2 includes interior splined portion 2a in the rearward portion thereof which extends within stationary bracket 1. Stationary bracket 1 includes substantially horizontal portion 1a and substantially vertical portion 1b. Eight-shaped plate 40 includes upper and lower openings and fits with corresponding circular receiving portions of vertical portion 1b. Lower main shaft 2 and support member 30 extend through the upper opening of plate 40.

Tube shaped slider 3 includes a forward open part and a rearward enclosed part, that is, the forward part is generally semicircular in cross section and the rearward part is generally fully circular in cross section. Extensions 3a extend laterally from the forward surface of slider 3, approximately from either side of a diagonal diameter of the semi-circular cross section of slider 3. Holes 3b are formed through extensions 3a. Extensions 1c extend from vertical portion 1b of bracket 1 and include holes 1d formed therethrough. Extension 3a and holes 3b of slider 3 generally correspond to extensions 1c and holes 1d of stationary bracket 1. Gear 20 is rotatably mounted within an upper circular receiving portion of vertical portion 1b of stationary bracket 1. A pair of first screw shafts 22 are formed integrally with a pair of first gears 21 and are positioned through holes 1d of stationary bracket 1 and holes 3b of slider 3. Nuts 23 are disposed on first screw shafts 22 and are fixed within holes 3b of extensions 3a by suitable fixing means 23a. Rotation of gear 20, results in corresponding rotation of gears 21 and integral first screw shafts 22, causing nuts 23 and slider 3 to which nuts 23 are fixedly attached to move in the axial direction toward or away from stationary bracket 1.

Upper bracket 6 includes saddle-shaped forward section 6a, and shaft extension 6b extending from saddle-shaped section 6a. Each side of saddle-shaped section 6a includes upper and lower holes extending therethrough. Attachment screw and washer means 60 link saddle-shaped section 6a to pivot pin 5 disposed within slider 3 via holes in slider 3. Upper bracket 6 is pivotable about pin 5 and is axially movable with slider 3. Upper main shaft 8 is rotatably journalled within shaft section 6b of upper bracket 6 and steering wheel 7 is fixedly mounted to upper main shaft 8. Middle main shaft 4 includes splined outer portion 4a which is connected to splined interior portion 2a of lower main shaft 2 within the upper circular receiving portion of vertical section 1b of stationary bracket 1. Upper main shaft 8 is linked to middle main shaft 4 via pivot pin 9 which is coaxially positioned with pivot pin 5 within slider 3. Upper main shaft 8 is both pivotable with respect to middle main shaft 4 about pin 9, and is rotatable and movable together with middle main shaft 4 in the axial direction. Additionally, middle main shaft 4 is movable in the axial direction relative to lower main shaft 2 and is rotatable together with lower main shaft 2 due to the splined connection therebetween. Thus, upper bracket 6 and upper shaft 8 are simultaneously pivotable with respect to middle shaft 4 around pivots 5 and 9 respectively, upper shaft 8 is rotatable and axially movable with middle shaft 4, upper bracket 6 is axially movable with middle shaft 4 when slider 3 moves axially, and upper bracket 6 and upper main shaft 8 are simultaneously pivotable or simultaneously axially movable with respect to stationary bracket 1.

A driving means including motor 10 having rotating worm 11 is fixedly engaged with extension 1e of stationary bracket 1. Worm 11 is in mesh engagement with worm wheel 12 which together constitute a conventional speed reduction means. Worm wheel 12 is mounted on an extension of shaft 13 at one end, and gear 14 is mounted on the other end of shaft 13. Rotation of worm wheel 12 by motor 10 thereby causes rotation of gear 14 via shaft 13. Gear 14 is in further mesh engagement with gear 15 having splined interior portion 15a. Splined portion 15a is in further splined connection with splined portion 16a of rod 16. Rod 16 is disposed within gear 15 and rod 16 is movable in the axial direction relative to gear 15 and is also rotatable jointly with gear 15 such that gear 15 maintains contact with gear 14 to rotate therewith, an splined portions 15a and 16a remain in contact so that rotation of gear 15 rotates gear 16. Rod 16 includes rod portion 16b extending from and having a smaller diameter than splined portion 16a. Slider 17 includes slider housing 17b and inner splined and threaded portion 17a which is in splined connection around splined portion 16b of rod 16 such that portion 17a is movable in the axial direction relative to housing 17b. Slider 17 is further operatively connected to a switching means including motor 18 having rotatable threaded screw 18a extending within the threaded part of portion 17a. Rotation of motor 18 and threaded screw 18a causes portion 17a and rod 16 to jointly move in the axial direction between a forward and a rearward position. Motor 18, slider 17, screw 15 and gear 16 are generally disposed along the same axis, along with the lower circular receiving portion of vertical portion 1b of bracket 1. These elements are offset relative to gear 14 and to motor 20 which drives gear 14.

Gear 19 is rotatably mounted within the lower circular receiving portion of vertical portion 1b of stationary bracket 1 and includes inner splined portion 19a which is engagable with splined portion 16a of rod 16. Thus, gear 19 is coaxial and surrounds rod 16 which is movable therein. Slider 17 and gear 19 are disposed on opposite sides of a lower extension of eight-shaped support member 40. When splined portions 16a and 19a engage, that is, rod 16 is in its forward position, gear 19 rotates together with rod 16. Additionally, gear 19 is in further mesh engagement with gear 20 disposed above gear 19. Therefore when rod 16 and gear 19 are rotatably engaged, rotation of rod 16 results in rotational motion of first screw shafts 22 via gears 21. As discussed above, rotation of first screw shafts 22 causes nuts 23 to move therealong, thereby causing slider 3, and middle main shaft 4, upper main shaft 8 and upper bracket 6 linked to slider 3 to undergo telescopic motion with respect to stationary bracket 1. Thus, steering wheel 7 undergoes telescopic motion via upper main shaft 8 and upper bracket 6.

Second screw shaft 25 is rotatably mounted through lower projections of slider 3 and includes forward splined portion 25a extending therefrom. Splined portion 25a is engaged within rearward interior splined portion 24b of gear 24. Second screw shaft 25 undergoes rotation with gear 24 and is axially movable with respect to gear 24. Forward inner splined portion 24a of gear 24 is engageable with splined portion 16a of rod 16. When gear 24 is engaged with rod 16, that is, rod 16 is in its rearward position, gear 24 and rod 16 are rotatable together by motor 10 through the intermediary elements. Second screw shaft 25 is also threadably connected to nut mechanism 26 disposed thereon which is further linked to a lower projection of saddle-shaped portion 6a of upper bracket 6 via screw means 61. Second screw shaft 25 is threadably connected within nut mechanism 26 between the lower projections of slider 3. Therefore, rotation of rod 16 by motor 10 via gears 14 and 15 causes rotational motion to be transmitted to second screw shaft 25 via gear 24 when rod 16 and gear 24 are rotatively engaged. Rotation of second screw shaft 25 causes nut mechanism 26 to move therealong in the axial direction. Movement of nut mechanism 26 causes upper bracket 6 to pivot about pivot pin 5, and upper main shaft 8 to pivot about pivot pin 9, causing pivoting motion of steering wheel 7.

Figure 3:
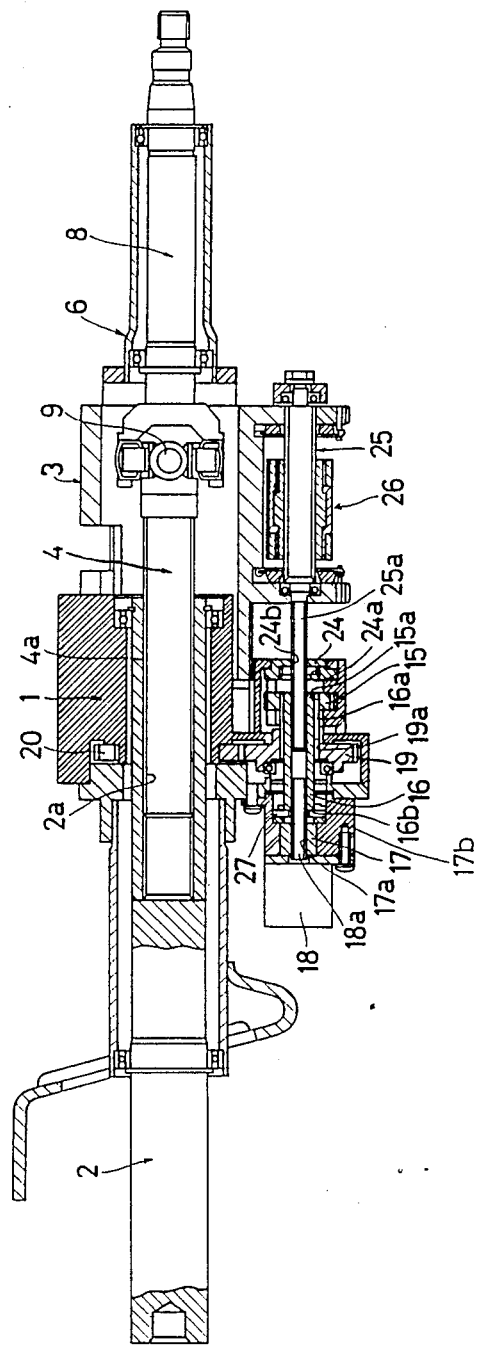
FIG. 3 is a side view of the vehicle steering mechanism of FIG. 2 showing interior elements of the mechanism, and in which telescopical movement of the steering towards the driver has not yet been performed and in which tilting movement may be performed.

In operation, when the steering mechanism is in the forward position and rod 16 is in the forward position engaging gear 19 as shown in FIG. 3, if motor 10 is driven, worm 11, worm wheel 12, gear 14 and gear 15 are rotated in turn. Furthermore, rod 16 is also rotated due to the splined engagement between splined portion 15a of gear 15 and splined portion 16a of rod 16. Additionally, due to the splined engagement between splined portion 19a of gear 19 and splined portion 16a of rod 16 which is now rotating, gear 19 rotates as well causing gear 20 to rotate. Thus, integral gears 21 and first screw shafts 22 are rotated, causing nuts 23 to move along screw shafts 22. Slider 3 and upper bracket 6 attached thereto are moved in the axial direction relative to stationary bracket 1 and middle main shaft 4 and upper main shaft 8 are moved in the axial direction relative to lower main shaft 2. Second screw shaft 25 moves axially within gear 24 to allow movement of slider 3. Thus, steering wheel 7 is telescopically moved.

Figure 4:
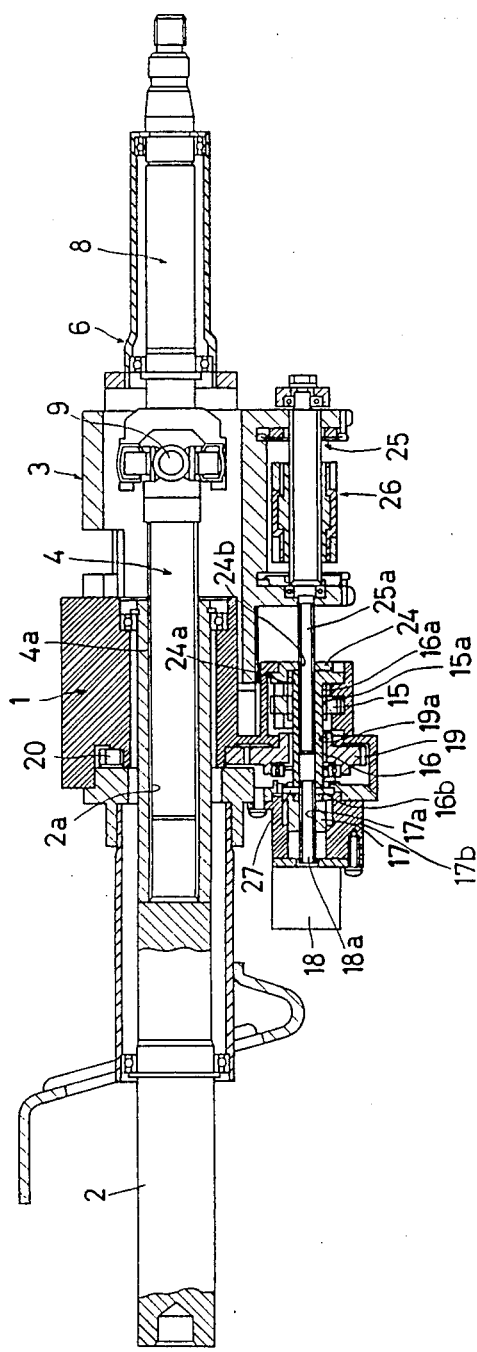
FIG. 4 is a side view of the vehicle steering mechanism of FIG. 3 in which telescopical movement of the steering wheel toward the driver has been performed and in which tilting movement of the steering wheel may be performed.
Figure 5:
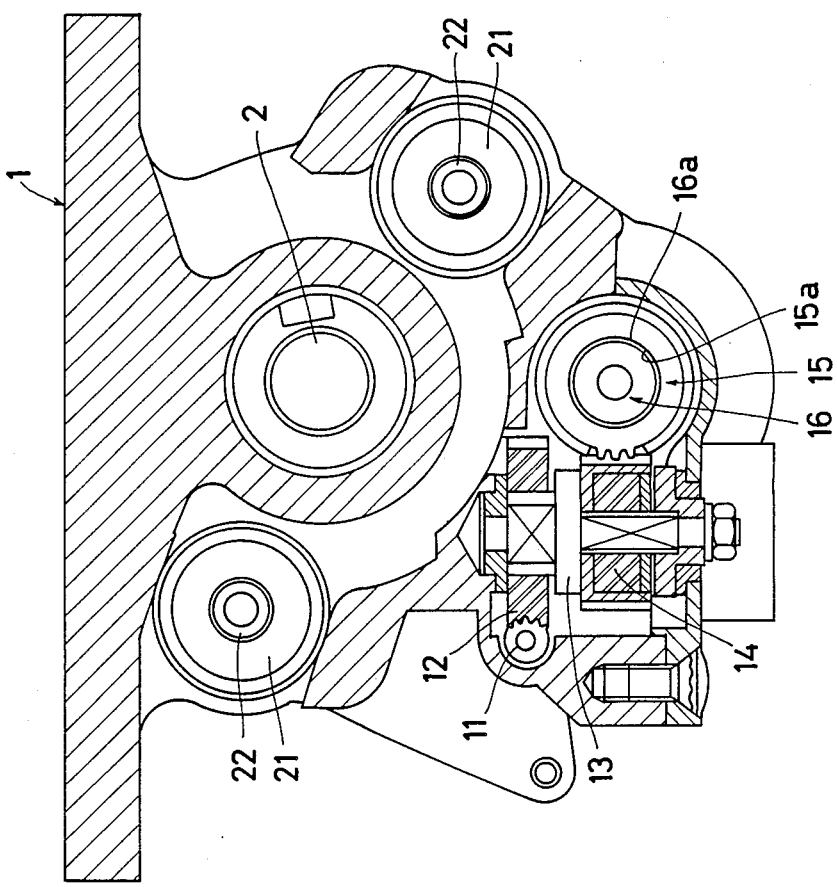
FIG. 5 is a cross section of the mechanism shown in FIG. 2 taken along the line V—V as viewed from the right.
Figure 6:
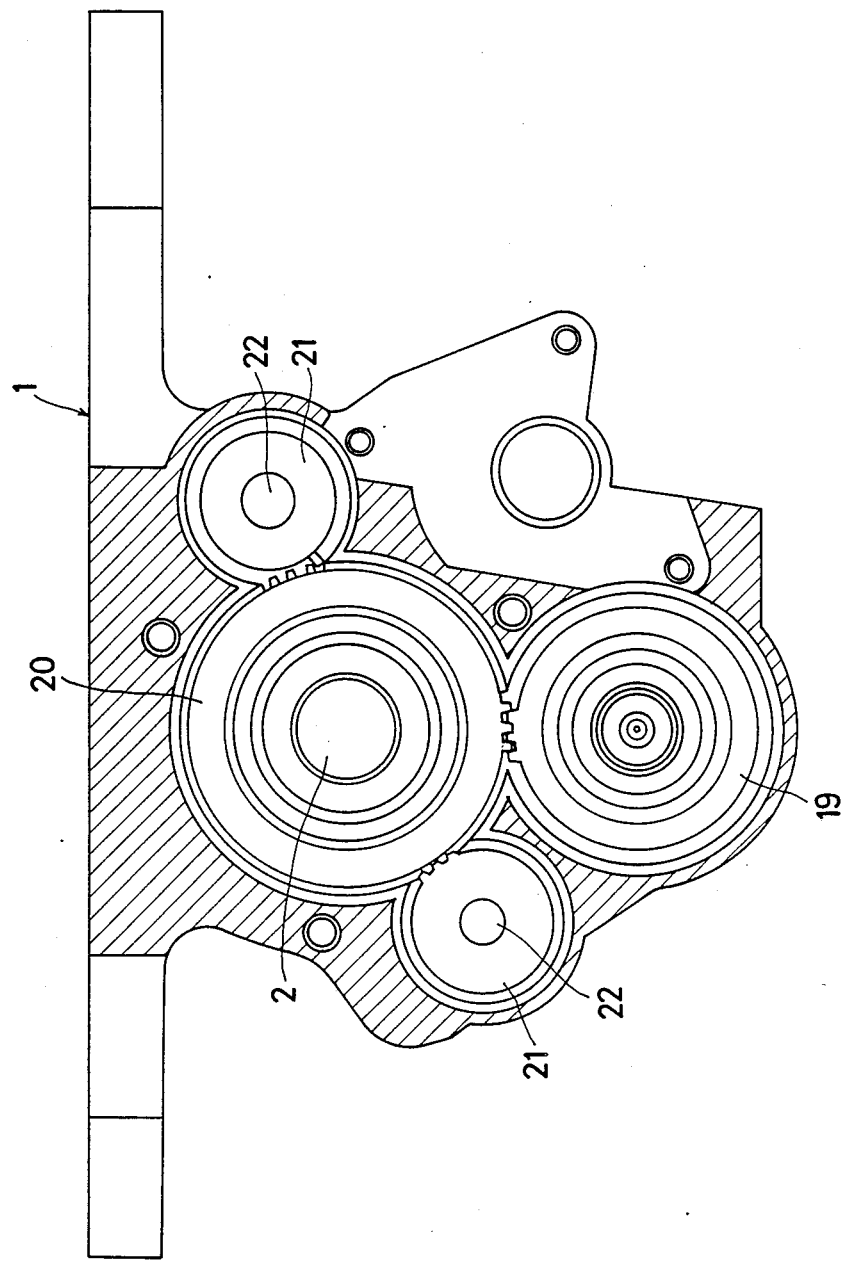
FIG. 6 is a cross section of the mechanism shown in FIG. 2 taken along the line VI—VI as viewed from the left.
Figure 7:
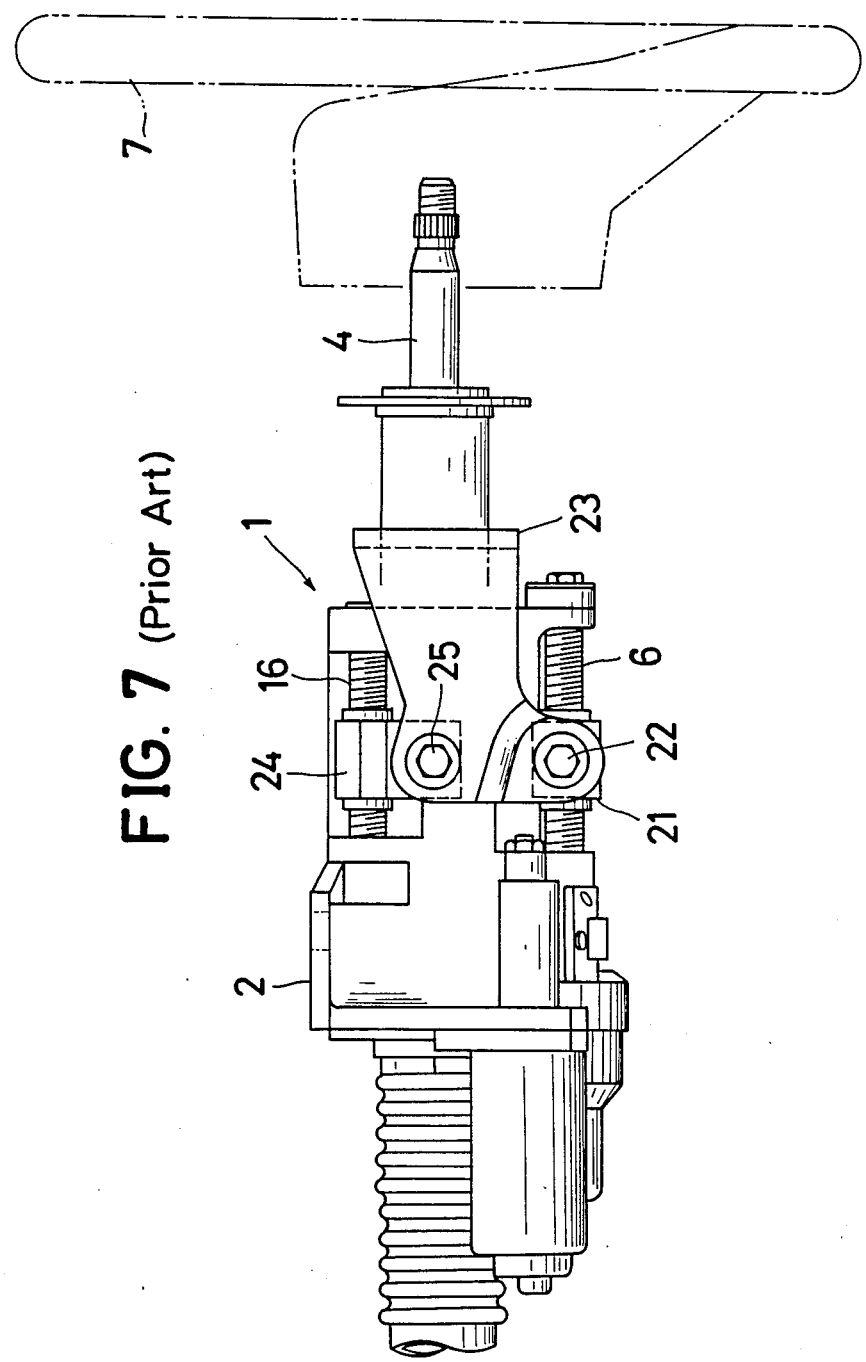
FIG. 7 is an exploded perspective view of the vehicle steering mechanism shown in FIG. 2 including interior elements.

With further reference to FIG. 3, when motor 18 is rotated, threaded screw portion 18a is rotated as well, causing portion 17a to move therealong. Movement of portion 17a causes rod 16 to move therewith, and splined portion 16a of rod 16 is brought into engagement with interior splined portion 24a of gear 24 and out of engagement with gear 19. This situation is illustrated in FIG. 4. Thereafter, worm 11, worm wheel 12, gear 14 and gear 15 are rotated in turn due to rotation of motor 10. Rod 16 is also rotated due to the splined engagement which is always maintained between rod 16 and gear 15. In this situation, due to the splined engagement between splined portion 24a of gear 214, and splined portion 16a of rod 16, gear 24 is rotated as well. However, since splined portion 16a of rod 16 is not in contact with splined portion 19a of gear 19, gear 19 and thus gear 20 are not rotated, and slider 3 is not axially moved with respect to stationary bracket 1. Rotation of gear 24 causes second screw 25 to rotate along with gear 24, further causing nut mechanism 26 to move along second screw 25 in the axial direction. Since nut mechanism 26 is linked to upper bracket 6, and further since upper bracket 6 is not moved in the axial direction with respect to stationary bracket 1, upper bracket 6 pivots about pivot pin 5 relative to slider 3, and upper main shaft 8 pivots about pivot pin 9 relative to middle main shaft 4, causing steering wheel 7 to pivot as well.

By independently using either the telescopic operation or the tilting operation of the steering mechanism, the position of steering wheel 7 may be suitably adjusted. Additionally, since nuts 23 are not adjacent to either pivot 5 or pivot 9, excessive force is not applied to nuts 23 during tilting operation of steering wheel 7.

This invention has been described in detail in connection with the preferred embodiment. This embodiment, however, is merely for example only and the invention is not restricted thereto. It will be understood by those skilled in the art that other variations and modifications can be easily made within the scope of this invention as defined by the appended claims.

I claim:

1. A vehicle steering mechanism comprising:
    a stationary bracket fixedly mounted to a vehicle body;
    a lower main shaft rotatably journaled within said stationary bracket;
    a slider mounted for axial movement relative to said stationary bracket;
    an upper bracket pivotally mounted to said slider;
    a middle main shaft splined for rotatable motion with said lower main shaft and rotatably journalled within said slider;
    an upper main shaft rotatably journalled within said upper bracket and pivotally mounted with said middle main shaft to pivot with respect to said middle main shaft simultaneously with pivotal motion of said upper bracket with respect to said slider;
    axial moving means including at least one first screw shaft rotatably journalled to said stationary bracket, and at least one first nut threadably mounted on said at least one first screw shaft and connected to said slider, said axial moving means for causing axial movement of said slider with respect to said stationary bracket upon rotation of said at least one first screw shaft; and
    pivotal moving means including a second screw shaft rotatably journalled to said slider and axially immovable relative to said slider, and a second nut threadably mounted on said second screw shaft, said second nut pivotally secured to said upper bracket, said pivotal moving means for causing pivotal motion of said upper bracket with respect to said slider and simultaneously causing pivotal motion of said upper main shaft with respect to said middle main shaft upon rotation of said second screw shaft.

2. A vehicle steering mechanism as recited in claim 1, further comprising:
    driving means switchably linked to said screw shafts for rotating either said at least one first screw shaft or said second screw shaft; and
    switching means for switching the link of said driving means between either said at least one first screw shaft or said second screw shaft.

3. The vehicle steering mechanism recited in claim 2, said axial moving means comprising two parallel spaced first screw shafts, and two first nuts, one first nut mounted on each of said parallel first screw shafts.

4. The vehicle steering mechanism recited in claim 2, said switching means comprising a rod movable between a first position in which said rod is linked to said at least one first screw shaft, and a second position in which said rod is linked to said second screw shaft.

5. The vehicle steering mechanism recited in claim 4, said switching means further comprising a first motor linked to a second slider, said second slider further linked to said rod such that rotation of said motor moves said rod between said first position and said second position via said second slider.

6. The vehicle steering mechanism recited in claim 5, said rod including a splined portion, said switching means further including a first gear and a second gear, and first gear linked to said at least one first screw shaft and said second gear linked to said second screw shaft, said rod movable between said first position in which said splined portion engages said first gear, and a second position in which said splined portion engages said second gear.

* * * * *